Patented Apr. 10, 1951

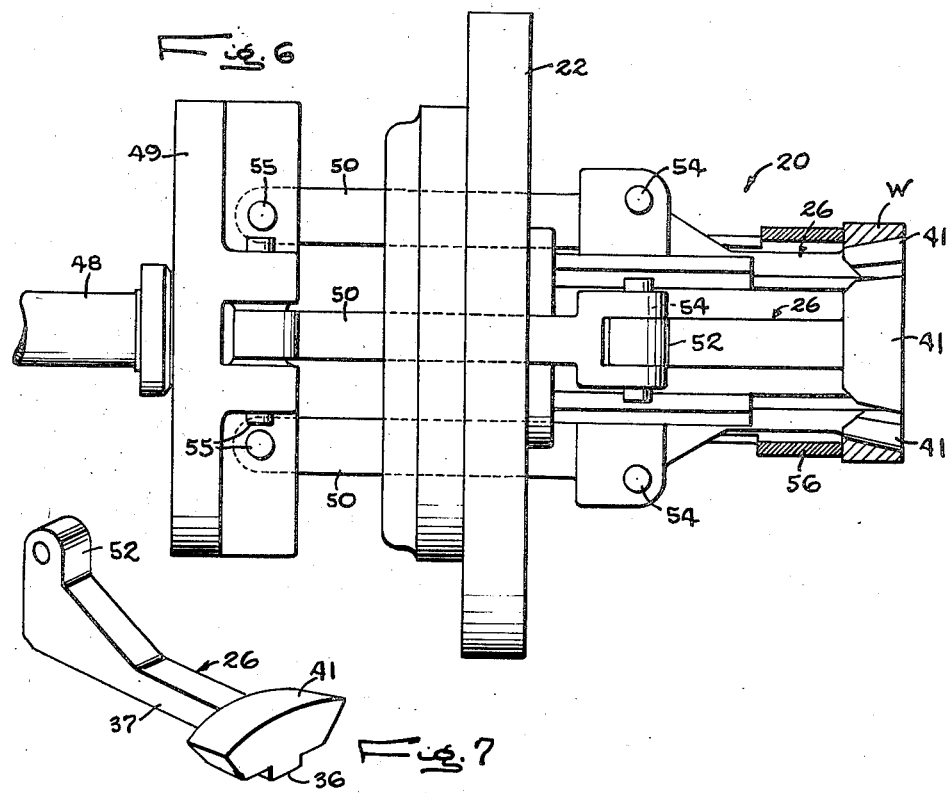
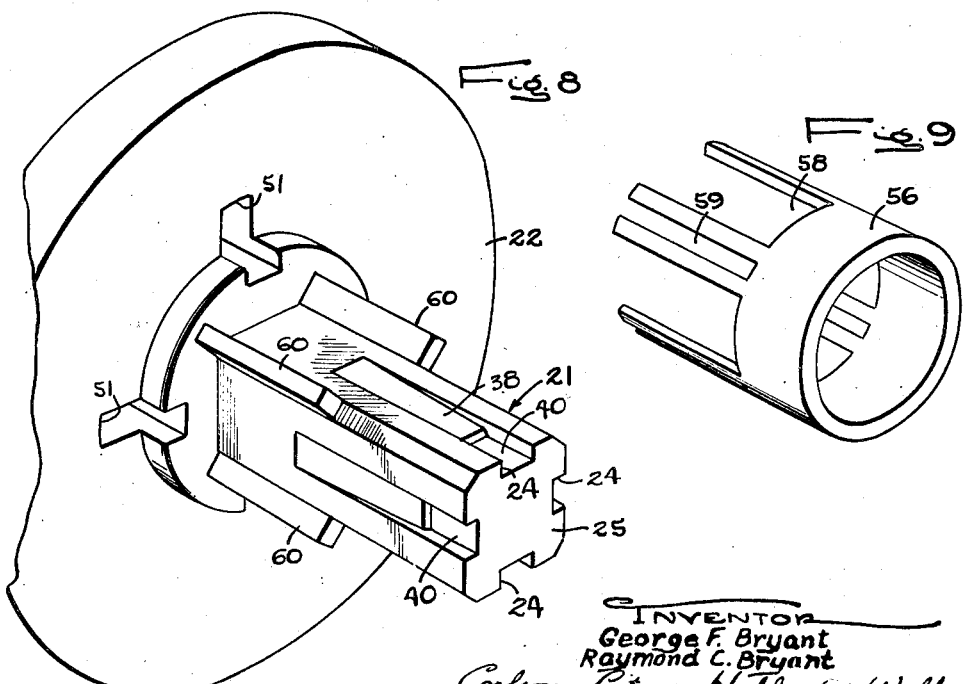
INVENTOR
George F. Bryant
Raymond C. Bryant
Carlson, Pitzner, Hubbard & Wolfe
ATTORNEY

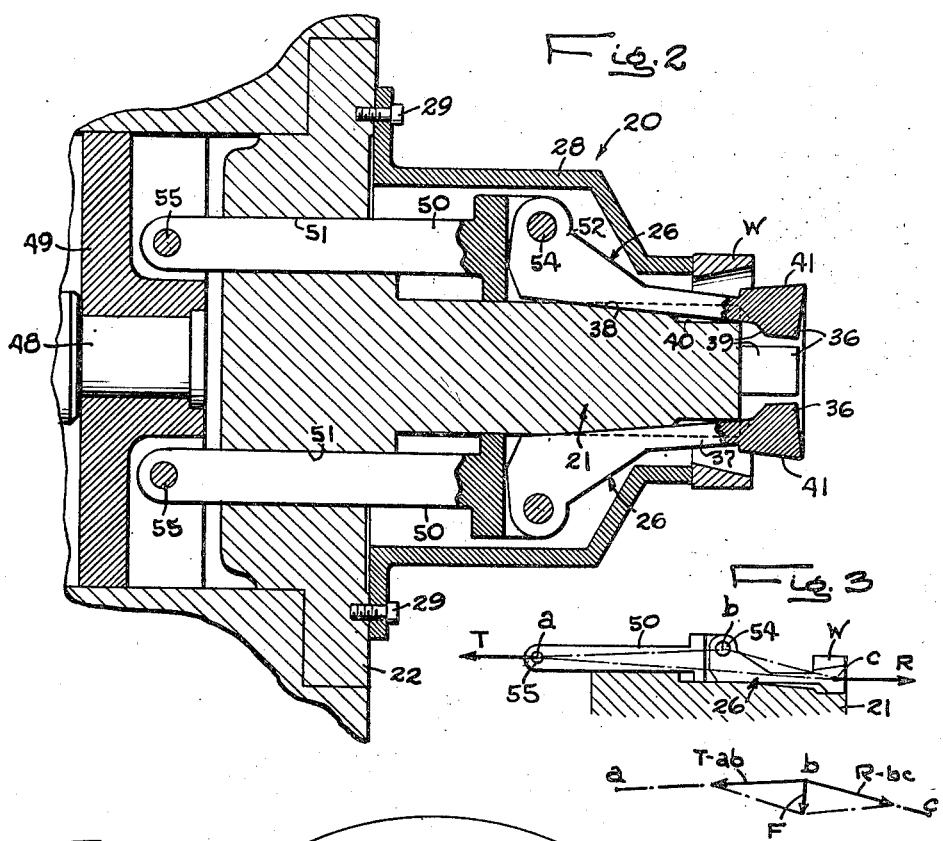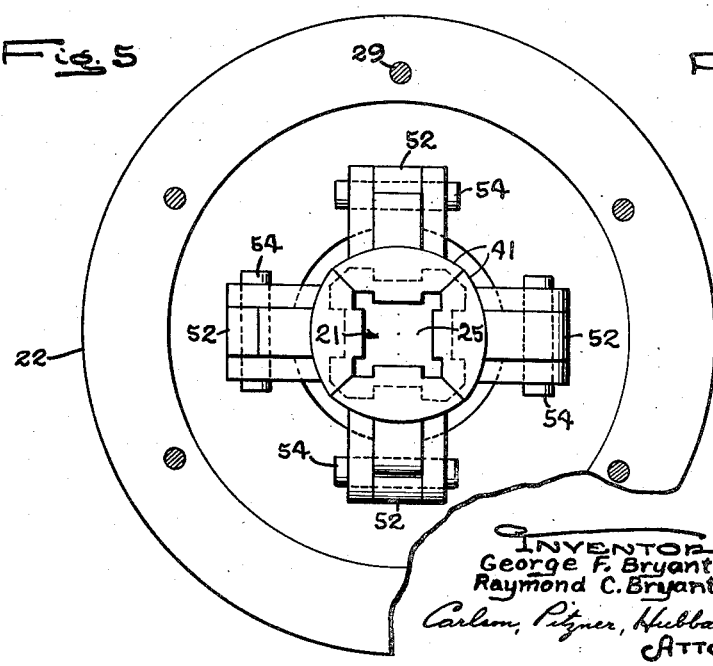

2,548,096

UNITED STATES PATENT OFFICE 2,548,096

EXPANDING MANDREL

George F. Bryant, Chicago, and Raymond C. Bryant, Oak Park, Ill.

Application April 19, 1949, Serial No. 88,368

13 Claims. (Cl. 279—2)

The present invention pertains generally to mandrels and more specifically to an expansible mandrel for supporting an internally bored workpiece while a machining operation is being performed thereon.

One of the objects of the invention is to provide an expansible mandrel which will be relatively free from vibration in those parts which are mounted for movement relative to the mandrel body. A related object is to accomplish the foregoing without adding complexities or expense to the mandrel structure.

Another object is to provide a mandrel of the above type capable of securely holding a workpiece to permit accurate machining of the same over a wide range of rotational speeds.

A further object is to provide a mandrel of the character set forth and which will be susceptible of easy accommodation to workpieces of various sizes.

Other objects and advantages will become apparent from the following detailed description of the invention and also from the accompanying drawings, wherein:

Fig. 2 is an enlarged fragmentary vertical sectional view of the mandrel shown in Fig. 1, such mandrel being in a collapsed condition.

Fig. 3 is a fragmentary longitudinal sectional view through a portion of the mandrel of Fig. 1 with certain force relationships being indicated.

Fig. 4 is a diagrammatic view further illustrating the force relationships existing in the parts shown in Fig. 3.

Fig. 5 is an enlarged fragmentary elevation detailing the projecting end of the mandrel shown in Fig. 2.

Fig. 6 is an enlarged fragmentary side elevation of the mandrel shown in Fig. 1 and illustrating the use of a modified form of stop sleeve.

Fig. 7 is an enlarged perspective view detailing one of the jaws of the mandrel shown in Fig. 1.

Fig. 8 is an enlarged fragmentary perspective view showing the mandrel body together with its mounting means.

Fig. 9 is an enlarged perspective view of the modified stop sleeve illustrated with the mandrel of Fig. 6.

Figure 1:
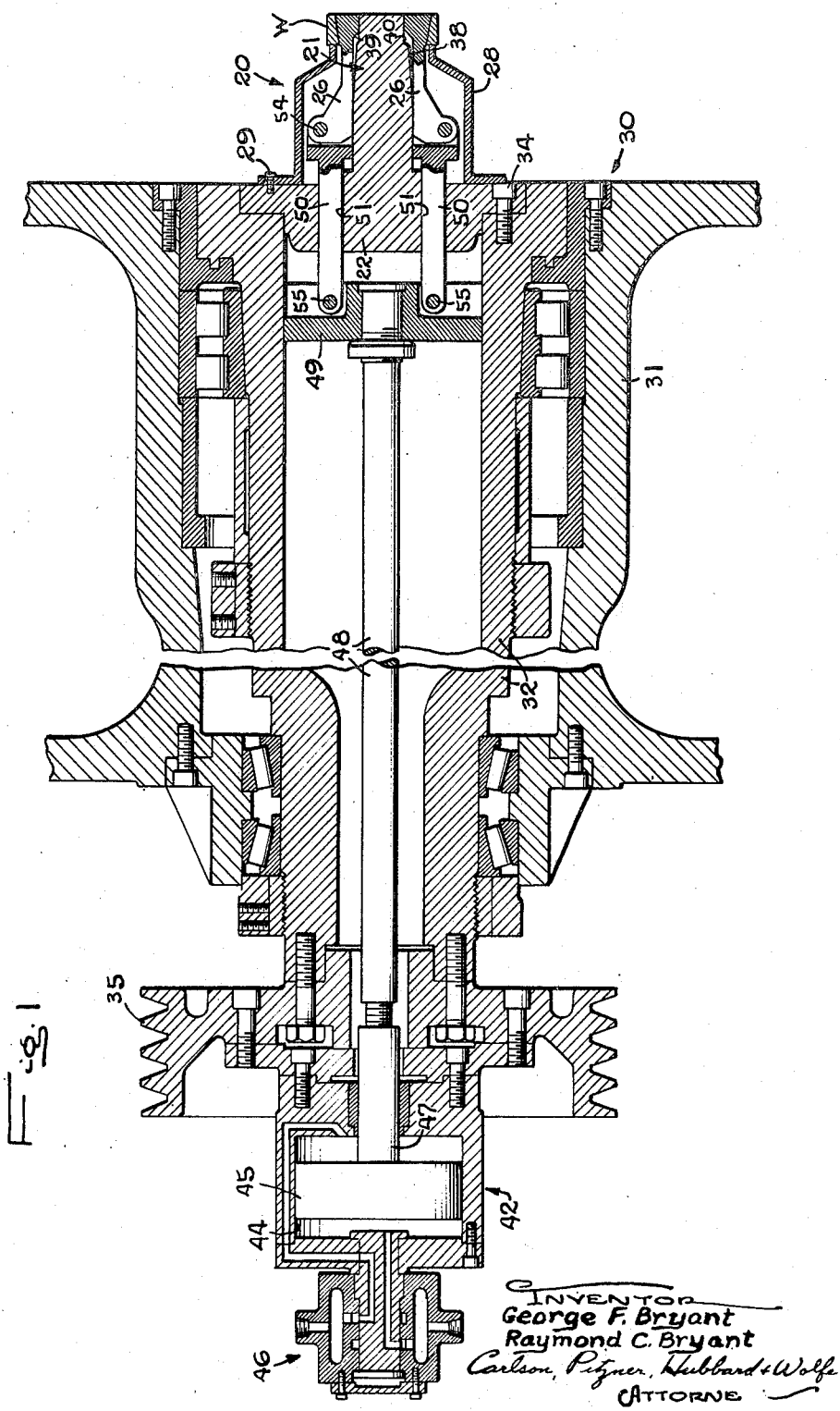
Figure 1 is a broken vertical sectional view taken longitudinally through a mandrel embodying the invention together with its supporting driving head.

While the invention is susceptible of various modifications and alternative constructions, a preferred embodiment has been shown in the drawings and will be described below in considerable detail. It should be understood, however, that there is no intention to limit the invention to the specific form disclosed, but, on the contrary, the intention is to cover all modifications and alternative constructions falling within the spirit and scope of the invention as expressed in the appended claims.

Referring further to the drawings, the invention is there exemplified in the form of an illustrative mandrel 20 adapted in the present instance to provide rotational support for an annular workpiece W having a frustoconical internal bore. The mandrel comprises a relatively short body 21 which in this particular case happens to be integral with a fairly heavy flanged adaptor plate 22. The body 21 is of substantially polygonal cross section, being formed with a series of circumferentially spaced, longitudinal grooves 24 terminating at its projecting end face 25. The grooves 24 are fashioned with substantially parallel side walls but radially stepped floors. Mounted in registry with the grooves 24 and arranged for radial as well as longitudinal movement relative to the body 21 are a corresponding series of jaws 26 which can be moved into gripping engagement with the workpiece W. To provide a solid abutment against which the workpiece W may be positioned by the jaws 26, the mandrel 20 carries a stepped sleeve 28 rigidly secured to the adaptor plate 22 as by means of machine screws 29 and having an annular stop face at one end thereof. In addition to its primary function, the stop sleeve 28 serves as a protective housing for the mandrel, keeping dirt and chips away from the movable parts thereof. The sleeve 28 also tends to restrain the jaws 26 against excessive outward movement due to centrifugal force in the event that the mandrel should be rotated without a workpiece thereon.

The mandrel 20 may be rotatably supported as by means of a driving head 30 comprising a frame 31 having a hollow rotatable spindle 32 drivingly journaled therein. The spindle 32 is suitably recessed at one end for receiving the flanged adaptor plate 22 which may be secured thereto as by means of one or more cap screws 34. At its opposite end, the spindle 32 is provided with a driving pulley 35 rigidly mounted thereon for receiving power from an appropriate source (not shown).

Provision is made for bringing the mandrel 20 from a collapsed to a fully expanded condition with a comparatively small initial longitudinal movement of the jaws 26 relative to the body 21 and upon the application of an almost negligible actuating force. This is accomplished by arranging the jaws 26 in such a manner that they will be cammed radially outward at an exceptionally rapid rate, reaching a fully expanded condition before the occurrence of any gripping engagement with the workpiece W. Referring to Figs. 2, 5 and 7, it will be observed that each of the jaws 26 is fashioned with a stepped undersurface defining a shoe 36 having a sliding face adjacent the work engaging end of the jaw. The shoe 36 is of approximately the same width as shank 37 of the jaw and, like the shank, is adapted to slide comfortably within one of the grooves 24. Connecting the sliding face of the shoe 36 with the underside of the shank 37, and of the same width as these surfaces, is a steeply inclined cam face 39. Assuming the mandrel 20 to be in a collapsed condition, with the shank 37 of each jaw abutting inclined inner step 38 in the floor of each of the grooves 24, the application of an initial increment of longitudinal movement to each of the jaws 26 will cause its cam face 39 to be accosted by the projecting end face 25 of the mandrel body. With continuing longitudinal movement of the jaws relative to the mandrel body, the cam faces 39 will ride up over the end face 25, guiding their associated shoes 36 onto outer steps 40 of the respective grooves 24. This position of the jaws defines the fully expanded condition of the mandrel 20.

After the mandrel 20 has reached its fully expanded condition, the jaws 26 may be urged into gripping engagement with the workpiece W with only a slight additional increment of longitudinal movement relative to the body 21. Thus each of the jaws 26 is provided adjacent its work engaging end with a tapered gripping pad 41, the taper of the latter decreasing from the end of the jaw toward the shank 37. The pads 41 are preferably shaped with a taper complementary to that of the bore of the workpiece W so as to wedgingly engage the same upon contact therewith and to draw the workpiece snugly into abutment with the end of the stop sleeve 28. Such wedging action is supported by the substantial bearing surface between the sliding faces of the shoes 36 and the outer step 40 in the floor of each of the grooves 24. The steps 40, incidentally, are preferably fashioned with surfaces having their longitudinal elements running generally parallel to the longitudinal axis of the mandrel body 21 and in this instance are substantially flat. Such arrangement serves to reduce drastically the degree of relative sliding movement under pressure between the jaws and the mandrel body required to grip the workpiece, thus minimizing wear on the parts concerned. By the same token, the construction just described makes it possible for a workpiece to be rapidly removed from the mandrel 20 with a relatively short longitudinal movement of the jaws 26 toward the projecting end face 25 of the mandrel body. Moreover, the need for an additional stop member to facilitate such action is completely obviated. Assuming that the jaws 26 are in tight gripping engagement with the workpiece W, and that such jaws are moved toward the end face 25, this condition will persist only until the cam surfaces 39 reach the outermost ends of the grooves 24. The surfaces 39 will thereupon ride out of the grooves 24, allowing the jaws to spring inwardly due to the elasticity of the workpiece. This will cause the immediate collapse of the mandrel and the spontaneous release of its hold on the workpiece W.

Any convenient means may be utilized for producing relative axial movement between the jaws 26 and the mandrel body 21. One very effective arrangement involves the use of a hydraulic actuator 42 such as that illustrated in Figure 1. Turning once more to such figure, it will be perceived that the actuator 42 is mounted coaxially of the spindle 32 and rigidly attached to the driving pulley 35 for rotation therewith. The actuator 42 includes the usual cylindrical bore 44 which houses a piston 45 reciprocable therein. Pressure fluid is admitted to the actuator 42 from a suitably controlled source via a stationary connecting hub 46 having passageways communicating with respective ends of the bore 44. Rigidly secured to the piston 45 is a piston rod 47 which, in turn, is adjustably coupled to a connecting rod 48 disposed coaxially within the spindle 32. Adjacent the end away from the actuator 42, the connecting rod 48 is provided with a crosshead 49 which, of course, follows the movements of the piston 45. To connect the crosshead 49 with the series of jaws 26, there is provided a corresponding number of links 50 pivotally attached to the crosshead and mounted for longitudinal sliding movement in a corresponding series of slots 51 in the adaptor plate 22. The slots 51 are, of course, in alinement with the grooves 24 in the mandrel body.

It has been observed that mandrels of the type thus far described are frequently subject to certain highly undesirable vibrations at various rotational speeds, notwithstanding the fact that such mandrels might be satisfactorily balanced from both a static and a dynamic standpoint. We have discovered that such vibration is due to a sort of "floating" action which occurs in the vicinity of the connections between the jaws and their respective connecting links. This condition, in turn, is due to the fact that the opposite ends of these parts are rigidly confined both radially and longitudinally while their connected ends are subjected to longitudinal stress only.

We have further discovered that this difficulty may be eliminated in a remarkably simple and economical manner without complicating the construction of the mandrel in any way. Accordingly, means is provided in the mandrel 20 for applying a generally radial damping force at the coupling between each of the jaws 26 and its corresponding link 50 as an incident to the application of gripping force to the jaws. This is accomplished by so constructing the jaws 26 and the links 50 that the pivotal connection joining each link and its corresponding jaw will be located radially outward of a line connecting the point at which the gripping tensile force is applied to the link and the point within the jaw constituting the effective center of reaction to such tensile force. This result is preferably achieved by fashioning each of the jaws 26 with an upturned tail 52 extending well above the horizontal medial plane of its shank 37 since the reaction force on the jaw may be said to act substantially along such plane. Adjacent the tail 52, the end of the link 50 is bifurcated and enlarged radially of the mandrel body to permit the insertion of a pivotal connection 54 in the vicinity of the outer extremities of the tail 52 and the enlarged portion of the link 50.

Referring more particularly to Fig. 3, the effect of the arrangement just described has been indicated diagrammatically in a longitudinal sectional view through one of the jaws 26 and its connecting link 50 together with an adjacent portion of the mandrel body 21. Assume now that the mandrel has been fully expanded and that the jaws have been moved into gripping engagement with the workpiece. Letting the tensile force exerted by the crosshead 49 upon the link 50 be designated by the letter T, it will be noted that such force acts at center $a$ of pivotal connection 55 between the crosshead and the link. The reaction which opposes the force T, on the other hand, has been designated by the letter R and is due to the combined frictional force and wedging effect between the outer step 40 of the groove 24 and the underside of the shoe 36, as well as that between the gripping pad 41 and the tapered bore of the workpiece W. For all practical purposes, it can be assumed that the reaction force R acts at a point $c$ adjacent the gripping end of the jaw and located in the vicinity of the medial horizontal plane of the shank 37. As clearly shown in the drawing, all the tensile force transmitted to the jaw 26 passes through the pivotal connection 54 and may be assumed to act through point $b$. With this arrangement, the connecting point $b$ is located radially outward of straight line $ac$ running between the point of application of the tensile force T and the effective center of the reaction force R.

Turning now to Fig. 4, the foregoing relationships will become even more apparent. Thus the component of the force T acting along the line $ab$ has been designated by the symbol $T-ab$. By the same token, the component of the reaction force R along line $bc$ has been designated by the symbol $R-bc$. Since these two components act in opposite directions and at an obtuse angle to one another, a generally radial thrust F is created tending to urge point $b$ against the mandrel body 21. As will be appreciated by those skilled in the art, the thrust F serves as a radial damping force and provides sufficient lateral support at the connection 54 to preclude vibration or "floating" of the jaws 26 and their associated connecting links 50.

Figs. 6 and 9 illustrate a modified form of stop sleeve 56 functionally similar to the stop sleeve 28 described earlier herein. In the present instance, it will be noted that the sleeve 56 is of generally cylindrical form but is provided with two alternate sets of longitudinal slots 58, 59 extending from one end and running along a substantial portion of its axial length. To solidly locate and at the same time key the sleeve 56 to the mandrel body 21, the latter may be fashioned with a series of circumferentially spaced rectangular ribs 60 (Fig. 8) of appropriate size to constitute a comfortable sliding fit with the groove 59. To mount the sleeve 56 on the mandrel body, it is merely necessary to bring the slots 59 and the ribs 60 into registry and to slide the sleeve axially until the slotted end of the same abuts the adaptor plate 22, the wide slots 58 automatically registering with and clearing the mandrel jaws 26. By the simple expedient of providing a graduated set of sleeves similar to the sleeve 56, it is possible to accommodate the mandrel 20 for use with workpieces of varying diameters and axial lengths.

Should it be desired to further simplify the mandrel 20, the stop sleeve can be completely dispensed with and its function fulfilled by suitably proportioning the ribs 60 of the mandrel body 21.

We claim as our invention:

1. An expansible mandrel comprising the combination of a body having longitudinal grooves therein, a mounting plate integral with said body and having longitudinal slots disposed in registry with said grooves, an axially movable actuating means, a plurality of jaws each mounted for longitudinal sliding movement in a respective one of the grooves of said body, each of said jaws having a gripping pad and a tail extending in a radial outward direction substantially beyond said pad, a plurality of links slidably mounted in the slots of said mounting plate for pivotally connecting respective ones of said jaws to said actuating means, and a pivotal connection between the tail of each of said jaws and a corresponding one of said links, said connection being located adjacent the radial extremities of each so as to create a generally radial thrust when said links are subjected to tension.

2. In an expansible mandrel, the combination comprising a body having circumferentially spaced longitudinal grooves therein, a mounting plate for said body and having longitudinal slots disposed in registry with said grooves, a series of jaws having radially projecting end portions, said jaws being mounted in the grooves of said body for longitudinal sliding movement relative to the latter, a plurality of links having radially projecting end portions disposed adjacent such portions of said jaws, said links being slidably mounted in the slots of said mounting plate and adapted to transmit tensile force to said jaws, and pivotal connecting members interposed between the outer extremities of said radially projecting end portions of said jaws and their respective links.

3. In a hollow rotatable spindle having an axially movable crosshead together with a power actuator and a connecting rod for moving said crosshead, an expansible mandrel comprising, in combination, a body having a longitudinal groove therein, a jaw mounted in said groove for sliding movement relative to said body, said jaw including a tapered segmental end portion adapted to grip the bore of a workpiece upon sliding of said jaw relative to said body, means for applying axial tensile force to said jaw for gripping the workpiece, said means including a connecting link pivotally secured to said jaw at a point which upon expansion of said mandrel is located radially outward of a hypothetical straight line running between the point of application of said axial tensile force on said link and the point within said jaw constituting the effective center of reaction to such tensile force.

4. For use with a hollow rotatable spindle having an axially movable crosshead together with a power actuator and a connecting rod for moving said crosshead, an expansible mandrel comprising, in combination, a body having a longitudinal groove therein, a jaw mounted in said groove and adapted to grip the bore of a workpiece upon sliding relative to said body, link means for applying axial tensile force to said jaw for gripping the workpiece, and a pivotal connection between said link means and said jaw, said connection upon expansion of said mandrel being located radially outward of a straight line drawn between the point of application of said axial tensile force on said link means and the point within said jaw constituting the effective center of reaction to such tensile force.

5. For use with a hollow rotatable spindle having an axially movable crosshead together with a power actuator and a connecting rod for moving said crosshead, an expansible mandrel comprising, in combination, a body having a series of circumferentially spaced longitudinal grooves therein, a series of jaws slidably mounted in said grooves and adapted to grip the bore of a workpiece upon sliding relative to said body, a series of links for applying axial tensile force to said jaws for gripping the workpiece, and pivotal connections between said links and respective ones of said jaws, each of said connections upon expansion of said mandrel being located radially outward of a straight line drawn between the point of application of said axial tensile force on said link and the point within said jaw constituting the effective center of reaction to such tensile force.

6. A jaw for an expansible mandrel of the character set forth and comprising, in combination, a shank, a tapered gripping portion, a sliding shoe, and an upstanding tail susceptible of the application of external force substantially above the medial horizontal plane of said shank.

7. A jaw for an expansible mandrel of the character set forth and comprising, in combination, a shank, a gripping pad adjacent one end of said jaw and tapered toward said shank, a sliding shoe underlying said gripping pad, an upstanding tail adjacent the opposite end of said jaw from said gripping pad, the end of said tail extending substantially above the medial horizontal plane of said shank and having provision for receiving a pivotal connection for the application of external force to said jaw.

8. In an expansible mandrel of the character set forth and having a body with a longitudinal groove therein terminating at the end face of said body, a jaw adapted for mounting within said longitudinal groove and comprising the combination of a shank, a gripping pad adjacent one end of said shank, a shoe underlying said gripping pad and having a sliding face laterally offset from the underside of said shank, and a relatively steeply inclined cam face connecting said sliding face of said shoe with the underside of said shank, said cam face being adapted upon riding over the end face of said body to force said jaw radially outward to define the fully expanded condition of said mandrel.

9. An expansible mandrel comprising, in combination, a body having a series of longitudinal grooves therein and an outwardly projecting end, the floors of said grooves adjacent the projecting end of said body being substantially parallel to the axis of the same, a series of jaws mounted upon said body in respective ones of said grooves, cam faces on said jaws adapted upon initial longitudinal movement of the latter relative to said body to expand said mandrel to full diameter, tapered gripping pads on said jaws adapted upon subsequent relative longitudinal movement to transmit a gripping thrust to a workpiece, and a stop for abuttingly engaging the workpiece in opposition to the thrust of said jaws thereon.

10. In an expansible mandrel, the combination comprising a body having a series of longitudinal grooves therein and a outwardly projecting end, the floors of said grooves adjacent the projecting end of said body being substantially parallel to the axis of the same, a series of jaws mounted upon said body in respective ones of said grooves, cam faces on said jaws adapted to rapidly expand said mandrel upon initial longitudinal movement of said jaws relative to said body, gripping pads on said jaws adapted to transmit a gripping thrust to a workpiece after previous expansion of said mandrel, a stepped sleeve disposed in surrounding relation with said mandrel and rigidly secured to said body, and an annular stop face on said sleeve for abuttingly engaging the workpiece in opposition to the thrust of said jaws thereon.

11. In an expansible mandrel, the combination of a longitudinally grooved body, a plurality of radial ribs on said body and disposed alternately with the grooves therein, gripping jaws disposed for radial and longitudinal sliding movement relative to said body, and a stop sleeve adapted to arrest the motion of a workpiece being gripped by said jaws, said stop sleeve being of appropriate diameter to slidably fit over said body, said stop sleeve also being slotted for registry with said ribs and said jaws.

12. In an expansible mandrel, the combination of a longitudinally grooved body, a plurality of radial ribs on said body and disposed alternately with the grooves therein, a series of jaws disposed for radial and longitudinal sliding movement relative to said body, tapered gripping pads on said jaws for wedgingly engaging a tapered bore in a workpiece, and a stop sleeve detachably mounted on said body to provide a solid abutment for positioning the workpiece being gripped by said jaws, said stop sleeve having alternate series of longitudinal slots for registry respectively with said ribs and said jaws.

13. In an expansible mandrel, the combination comprising a body having longitudinal grooves therein, the floor of each of said grooves having an inner inclined radial step and an outer radial step substantially parallel to the axis of said body, and a series of gripping jaws associated with respective ones of said grooves, each of said jaws having a shank adapted to abut said inner inclined step with said mandrel in a collapsed condition, each of said jaws having a sliding shoe adapted to abut said outer radial step with said mandrel in an expanded condition.

GEORGE F. BRYANT.
RAYMOND C. BRYANT.

REFERENCES CITED

The following references are of record in the file of this patent:

UNITED STATES PATENTS

| Number | Name | Date |
| --- | --- | --- |
| 573,325 | Gates | Dec. 15, 1896 |
| 959,515 | Gnebel | May 31, 1910 |
| 1,016,738 | Curry | Feb. 6, 1912 |
| 1,180,758 | Brekke et al. | Apr. 25, 1916 |
| 1,708,228 | Lovely | Apr. 9, 1929 |
| 2,361,085 | Carlson | Oct. 24, 1944 |
| 2,453,717 | Long | Nov. 16, 1948 |